United States Patent [19]
Muraki

[11] Patent Number: 5,948,037
[45] Date of Patent: Sep. 7, 1999

[54] ENGINE CONTROL SYSTEM WHICH REDUCES THERMAL DETERIORATION OF A TORQUE CONVERTER

[75] Inventor: Hirotada Muraki, Yokohama, Japan

[73] Assignee: Nissan Motor Co., Ltd., Yokohama, Japan

[21] Appl. No.: 09/027,219

[22] Filed: Feb. 20, 1998

[30] Foreign Application Priority Data

Feb. 21, 1997 [JP] Japan .................................. 9-037889

[51] Int. Cl.⁶ .......................... B60K 28/00; G05D 17/02; F02D 41/22
[52] U.S. Cl. ............................... 701/114; 701/54; 701/63
[58] Field of Search .................. 701/114, 110, 701/102, 101, 54, 51, 62, 63

[56] References Cited

U.S. PATENT DOCUMENTS

| | | | |
|---|---|---|---|
| 4,685,051 | 8/1987 | Hattori et al. .............................. | 701/63 |
| 4,805,751 | 2/1989 | Ohkumo et al. ......................... | 477/176 |
| 4,843,915 | 7/1989 | Sugimura et al. ........................ | 477/80 |
| 4,896,569 | 1/1990 | Ito et al. .................................... | 701/62 |
| 5,103,692 | 4/1992 | Shimanaka et al. ....................... | 74/857 |
| 5,111,717 | 5/1992 | Takeuchi et al. ......................... | 477/148 |
| 5,157,990 | 10/1992 | Ohashi ....................................... | 701/63 |
| 5,201,250 | 4/1993 | Kato et al. ................................ | 74/858 |
| 5,216,938 | 6/1993 | Yamaguchi ............................... | 701/63 |
| 5,224,045 | 6/1993 | Stasell ................................. | 364/431.07 |
| 5,228,368 | 7/1993 | Kato et al. ................................ | 74/866 |

FOREIGN PATENT DOCUMENTS

| | | |
|---|---|---|
| 60-4433 | 1/1985 | Japan . |
| 97/10965 | 3/1997 | WIPO . |

*Primary Examiner*—Willis R. Wolfe
*Assistant Examiner*—Hieu T. Vo
*Attorney, Agent, or Firm*—Foley & Lardner

[57] ABSTRACT

An engine control system reduces thermal deterioration of a torque converter. Maximum torque down control is provided, using simple processing and a minimum number of required signals, to reduce thermal deterioration. A maximum fuel injection amount QFULL is reduced when vehicle speed is less than a predetermined value that is close to zero, thereby lowering maximum engine torque. Also, the presence or absence of an abnormal vehicle speed sensor is diagnosed and maximum engine torque is also lowered during occurrence of an abnormality.

12 Claims, 6 Drawing Sheets

5,948,037

ENGINE CONTROL SYSTEM WHICH REDUCES THERMAL DETERIORATION OF A TORQUE CONVERTER

BACKGROUND OF THE INVENTION

The invention relates to an engine control system for a vehicle having an automatic transmission, with a torque converter, at the power output side of the engine.

In such a vehicle, if the accelerator pedal is depressed when the automatic transmission is in a running range (such as a D range) or the like and the vehicle is stopped due to braking or a curbstone, the rotational difference between the input side and the output side of the torque converter, that is, the slip, becomes large. If this condition continues, the amount of heat generated inside the torque converter becomes large which may cause thermal deterioration of the torque converter or cause the torque converter to stall.

Japanese Patent Provisional Publication No. 60-4433 discloses an engine control system for preventing thermal deterioration of a torque converter. In this publication, when a shift lever is shifted from a stopping range to a running range, and the accelerator is depressed while the vehicle is stopped, the torque is immediately reduced (that is, immediately upon operation of the shift lever to the drive range). Torque is reduced by decreasing the fuel injection amount, or decreasing the amount of intake air, to place the engine in an idling condition and place the automatic transmission into an engaging condition.

However, in such a conventional engine control system, a range changeover signal for the automatic transmission must be input to the engine control system. This complicates the circuit arrangement. Also, if the range changeover signal is abnormal, the control described above becomes disabled.

SUMMARY OF THE INVENTION

An object of the invention is to solve such conventional problems and provide a satisfactory and relatively simple control system which prevents the torque converter from becoming stalled or deteriorated.

In this invention, a maximum torque schedule, or table, is lowered when the detected vehicle speed is below a preset value (e.g., 8 km/hr). The invention can be applied to a vehicle having an automatic transmission with a torque converter at a power output side of the engine. The invention includes a vehicle speed detector to detect vehicle speed and control units and associated components to restrict engine output magnitude to a lower engine output, relative to a calculated value, when the detected vehicle speed is less than a predetermined value. In one embodiment, engine output magnitude is restricted by lowering maximum engine torque when the detected vehicle speed is less than a predetermined value.

With this design, when vehicle speed is less than (or not greater than) the predetermined value (around 0 km/hr), the maximum output torque of the engine is lowered to accomplish torque down control to prevent thermal deterioration, by employing merely a vehicle speed signal. It is important to note that torque is not necessarily reduced immediately upon detecting vehicle speed falling, but instead a maximum torque table is changed to a table having lower maximum torques.

In one embodiment for a diesel engine, maximum engine torque lowering is accomplished by restricting the required fuel injection amount of a fuel injection pump to a level less than (or not higher than) a maximum injection amount. With this design, because maximum torque is lowered by restricting the maximum injection amount, potentially serious problems related to vehicle controllability or drivability should not occur even if, for some reason, the control malfunctions.

The invention also diagnoses the presence or absence of an abnormality in vehicle speed detection (for example, in a vehicle speed sensor). When such an abnormality is detected, the maximum engine torque is lowered to improve safety. In this diagnosis, the abnormality can be diagnosed using vehicle speed information from a control device for the automatic transmission to which a signal from another vehicle speed sensor is input, to facilitate the diagnosis.

Further, the invention can prohibit operation of maximum engine torque lowering when the engine is being started, to prevent any adverse impact on engine starting performance.

BRIEF DESCRIPTION OF THE DRAWINGS

The invention will be described in further detail below with reference to the drawings, wherein.

DETAILED DESCRIPTION OF PREFERRED EMBODIMENTS

Figure 1:
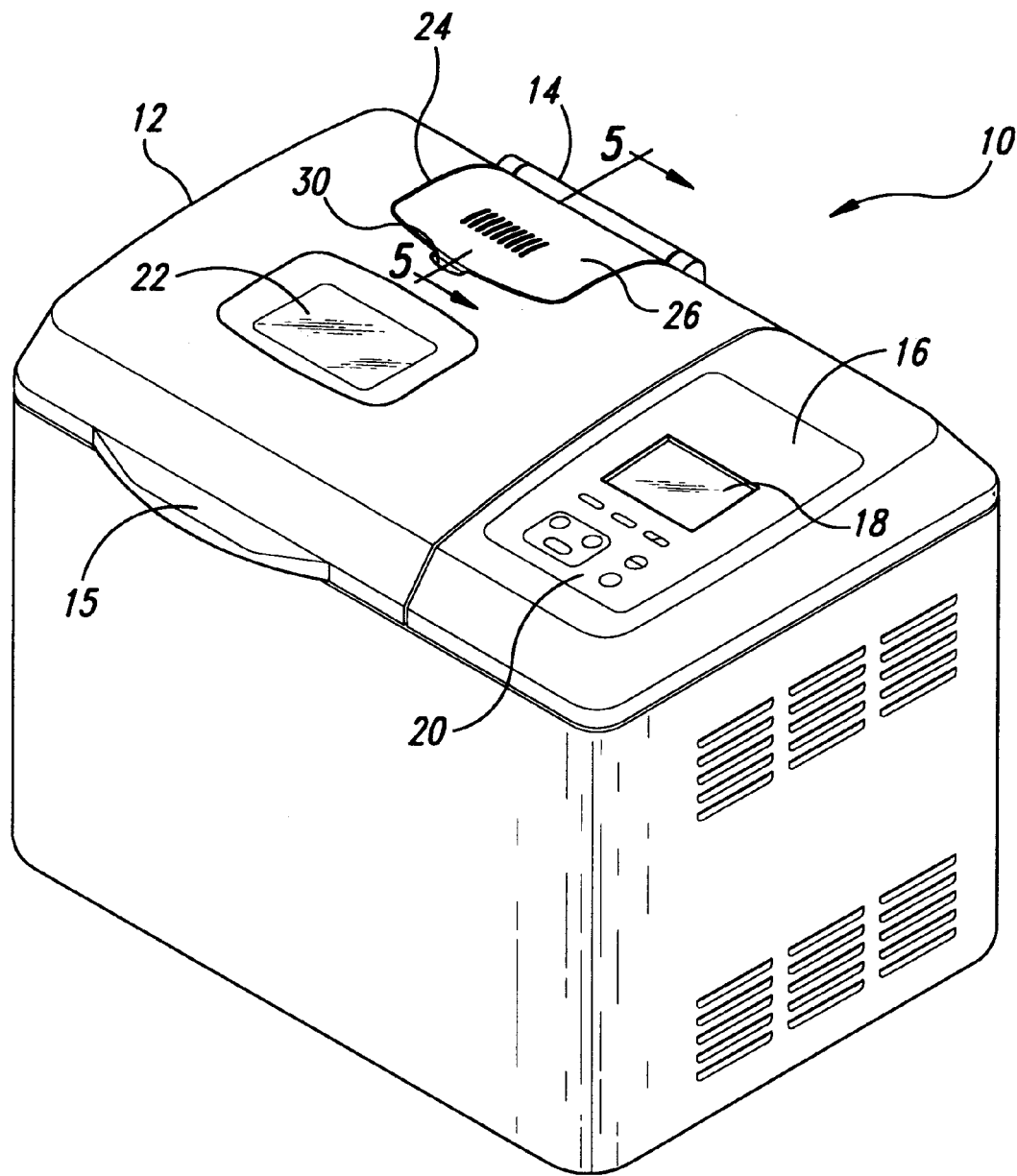
FIG. 1 is a block diagram of the invention.

FIG. 1 is a block diagram of the invention. The invention provides an engine control system for a vehicle which has an automatic transmission with a torque converter at an output side of the engine. The automatic transmission can be a multiple gear ratio automatic transmission or a continuously variable automatic transmission.

The invention includes a vehicle speed detecting section 1002 for detecting the vehicle speed and a maximum engine output (torque and/or power) lowering section 1004 for lowering a maximum output of the engine when the detected vehicle speed is less than (or not higher than) a predetermined value. Engine output is not necessarily lowered immediately upon detecting vehicle speed falling below the predetermined value. Instead, the maximum allowable output is immediately lowered (a specific example of this will be described below in connection with the QFULLG curve and the QFSVPO curve in FIG. 7).

The maximum engine output lowering section 1004 can be, for example, a maximum engine torque lowering section. Maximum engine torque can be lowered by, for example, decreasing the maximum fuel injection amount.

A restricting section 1006 is provided to compare a required, or calculated, output with the maximum allowable output amount and to restrict engine output to a level not greater than the maximum output amount. Such restriction can be accomplished by, for example, restricting an injection amount of a fuel injection pump.

A sensor abnormality diagnosing section 1008 diagnoses the presence or absence of abnormality in the vehicle speed detecting section 1002. When a diagnosing section is provided, the invention can lower the maximum engine output when the detected speed is less than the predetermined value, or when diagnosing section 1008 indicates that an abnormality exists in vehicle speed detection. The abnormality can be detected by, for example, using vehicle speed information from a control unit for an automatic transmission which receives a signal from another vehicle speed sensor. This technique takes advantage of the availability of another vehicle speed sensor and initiates maximum engine output lowering as a precautionary measure, if the results from both speed sensors do not match.

A maximum engine output lowering canceling section 1010 prohibits lowering of the maximum engine output (by section 1004) during engine stopping and/or starting.

Figure 2:
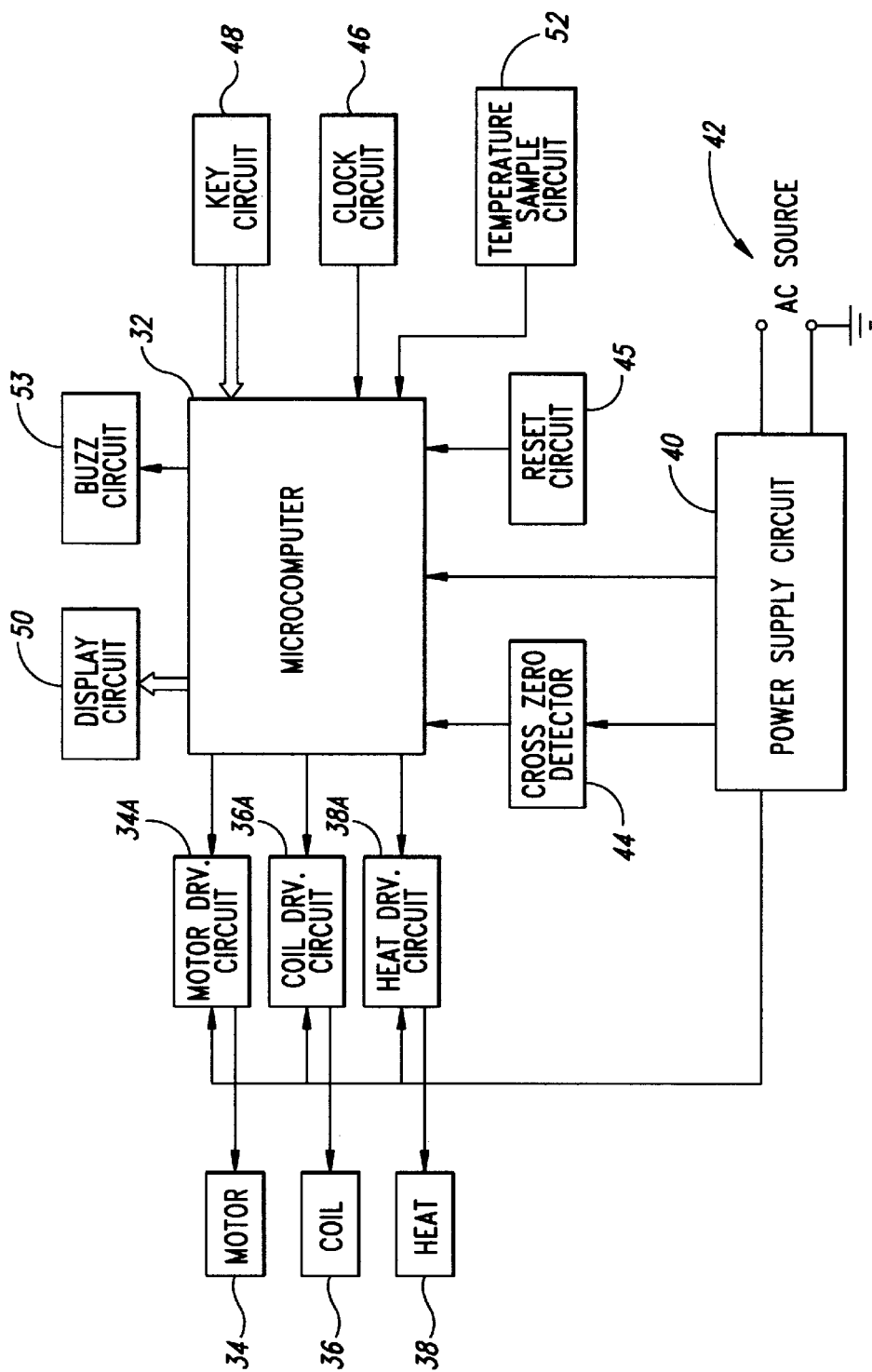
FIG. 2 is an illustration of one specific embodiment of the invention.

FIG. 2 is an illustration of one specific embodiment of the invention. In FIG. 2, a diesel engine 1 is provided with a distributor type fuel injection pump 2, as an engine control device, which is driven through a timing-pulley-belt mechanism by a power output shaft of the engine 1. This fuel injection pump 2 is arranged to distribute and feed high pressure fuel to a fuel injector nozzle 3 for each engine cylinder through high pressure piping.

A variety of signals are input to an engine control unit 4. These signals are received from an engine speed sensor 11 for detecting an engine speed NE, an acceleration sensor 12 for detecting an accelerator opening degree (a depression amount of the accelerator pedal) ACC, a first vehicle speed sensor 13 for detecting a vehicle speed, starter switch 15 for detecting operation thereof by a driver, brake pedal switch 16, and the like.

The engine control unit 4 is arranged to calculate a fuel injection amount for each engine cylinder in accordance with the engine speed NE and the accelerator opening degree ACC, and to control an electronic governor device of the distributor-type fuel injection pump 2 in accordance with a signal, thereby realizing fuel injection amount control.

An automatic transmission 5 is connected to the power output side of the engine 1. The automatic transmission 5 includes a torque converter 6 disposed at the power output side of the engine 1, a gear shift mechanism 7 connected to the engine through the torque converter 6, and a hydraulic actuator 8 for carrying out control to establish torque flow path(s) by engagement and disengagement of a variety of shift elements in the gear shift mechanism 7. The invention can also be applied to a continuously variable automatic transmission, if installed with an upstream torque converter. Operating hydraulic pressure to the hydraulic actuator 8 is controlled in an ON-OFF manner through a variety of electromagnetic valves (not shown). Such control is described in, for example, U.S. Pat. Nos. 5,228,368 to Yuji Kato et al. 5,201,250 to Yuji Kato et al. and 5,103,692 to Shigeki Shimanaka, all these three patents being assigned to the assignee of this application, the entire contents of which is incorporated herein by reference.

A variety of signals are input to an automatic transmission control unit 9 for automatic transmission control. One of these signals is from a second vehicle speed sensor 14, which detects the vehicle speed with a higher accuracy than the vehicle speed sensor 13. Control unit 9 also receives the acceleration sensor 12 output and the vehicle speed sensor 13 output. The reason why the second, higher accuracy, vehicle speed sensor 14 is provided for the control unit 9, in addition to the vehicle speed sensor 13, resides in the importance of vehicle speed information for shift control.

The first speed sensor 13 is normally installed in the transaxle. It has a pulse generator with a drive gear, which in turn is in engagement with a final drive output shaft via a speedometer drive gear mounted coaxially thereon. Speed sensor 13 thus provides a vehicle speed signal to engine control unit 4, automatic transmission control unit 9, and to a speedometer (not shown). This first sensor 13 functions as an auxiliary device to the second speed sensor 14 as far as control of the automatic transmission is concerned. When the second sensor 14 malfunctions, the automatic transmission control unit 9 then uses a signal from speed sensor 13.

Second speed sensor 14 is mounted on the automatic transmission housing to detect the revolution of the idler gear parking pawl lock gear and emits a pulse signal. The pulse train is sent to the automatic transmission control unit 9, which converts it into vehicle speed. The pulse signal is not directly sent to the engine control unit 4 (only in the form of the MI signal, to be discussed below, if the vehicle is detected as stationary). Automatic transmission control is normally made based on this second sensors information. The invention is, of course, not limited to this particular arrangement and use of sensor(s).

The automatic transmission control unit 9 performs a shift/select control for controlling the gear shift/select mechanism at a shift stage using the hydraulic actuator 8, for example, by automatically setting the shift stage among first speed through fourth speed in accordance with the vehicle speed and the accelerator opening degree ACC.

Additionally, for the purpose of diagnosis of the vehicle speed sensor 13 by the engine control unit 4, the automatic transmission control unit 9 outputs a predetermined vehicle speed non-reaching signal MI through a communication line which is fed to the engine control unit 4, when the vehicle speed detected by the second vehicle speed sensor 14 has not reached a predetermined vehicle speed (for example, 8 km/hr).

Next, the maximum torque down control carried out by the engine control unit 4 for the purpose of preventing deterioration of the torque converter 6 will be described with reference to the flowcharts of FIGS. 3 and 4.

Figure 3:
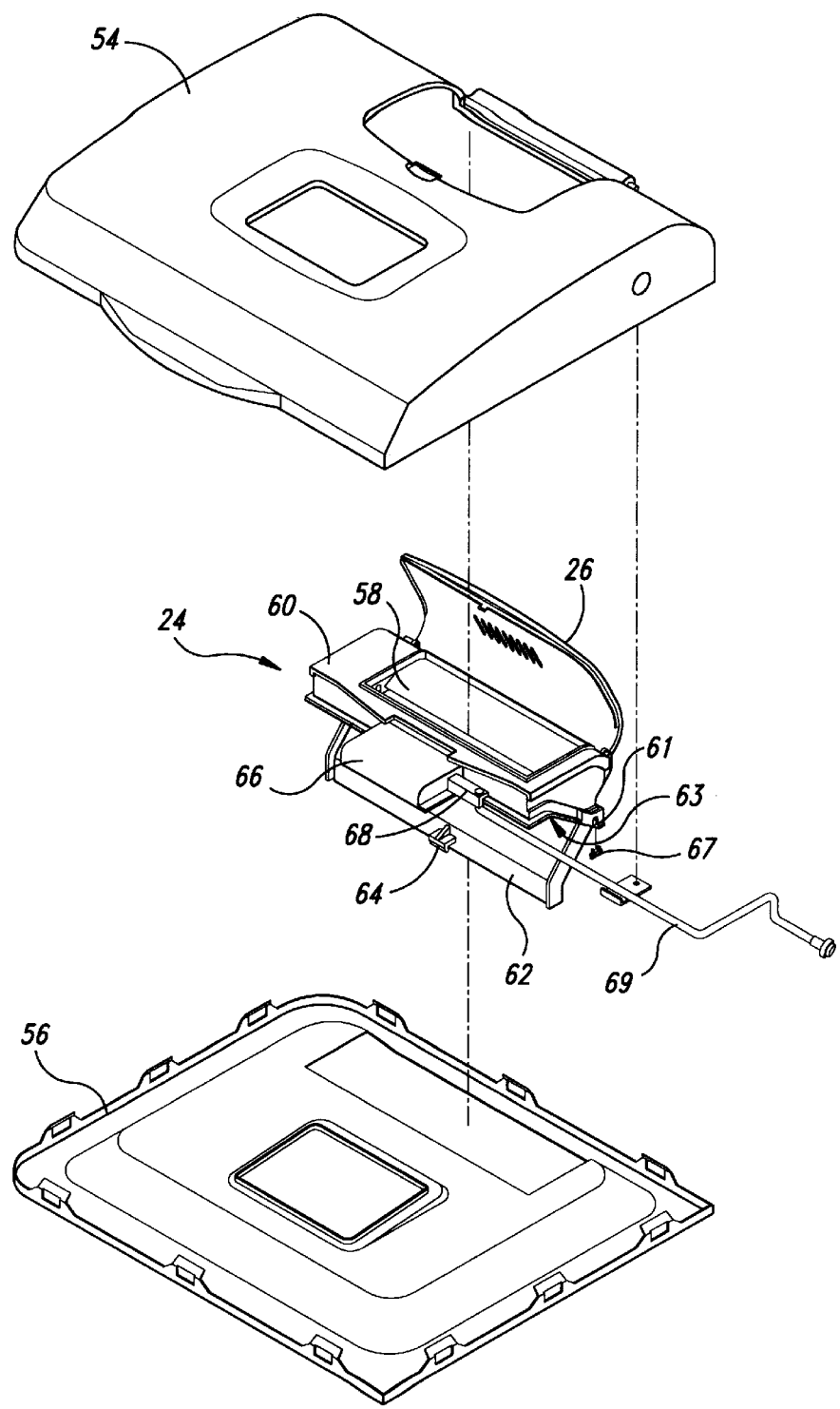
FIG. 3 is a flowchart of a maximum injection amount providing and selecting schedule routine.

FIG. 3 is a flowchart of a routine for selecting a maximum injection amount from a schedule or table. A schedule or table containing maximum injection amounts is stored in a memory in the engine control unit 4. The flowcharts in this disclosure illustrate processing which is carried out by a control unit using software, hardware, or a combination of software and hardware. For example, engine control unit 4 can be in the form of a Hitachi H8/536 processor, programmed in machine language to implement the flowcharts provided herein. Automatic transmission control unit 9 can be in the form of a Hitachi HC 11K4 processor programmed in machine language to implement the flowcharts provided herein.

At a step S1, the vehicle speed (hereinafter sometimes abbreviated "VSP") is read in accordance with the signal from the vehicle speed sensor 13.

At a step S2, a judgement is made as to whether the vehicle is substantially stopped, i.e., vehicle speed is not higher than a predetermined value (for example, 8 km/hr). If VSP≦the predetermined value, advance is made to step S4.

If VSP>the predetermined value, advance is made to step S3, and a judgment is made as to whether the vehicle speed sensor 13 is abnormal in accordance with a diagnosis result of the diagnosis routine in FIG. 6 (discussed below). If the vehicle speed sensor 13 is abnormal, advance is made to the step S4, similar to the case of VSP≦the predetermined value. This means that maximum torque down control will be initiated if the sensor 13 malfunctions even if VSP>the predetermined value.

At the step S4, a judgment is made as to whether or not the engine is running by ascertaining whether the engine is running below a fixed revolution (such as 30 or 40 rpm). If the engine is running, advance is made to a step S5.

At the step S5, a judgment is made as to whether or not a starter switch is turned OFF (meaning that the vehicle is in a non-starting period). If the starter switch is turned OFF, advance is made to steps S6 sand S7.

Figure 7:
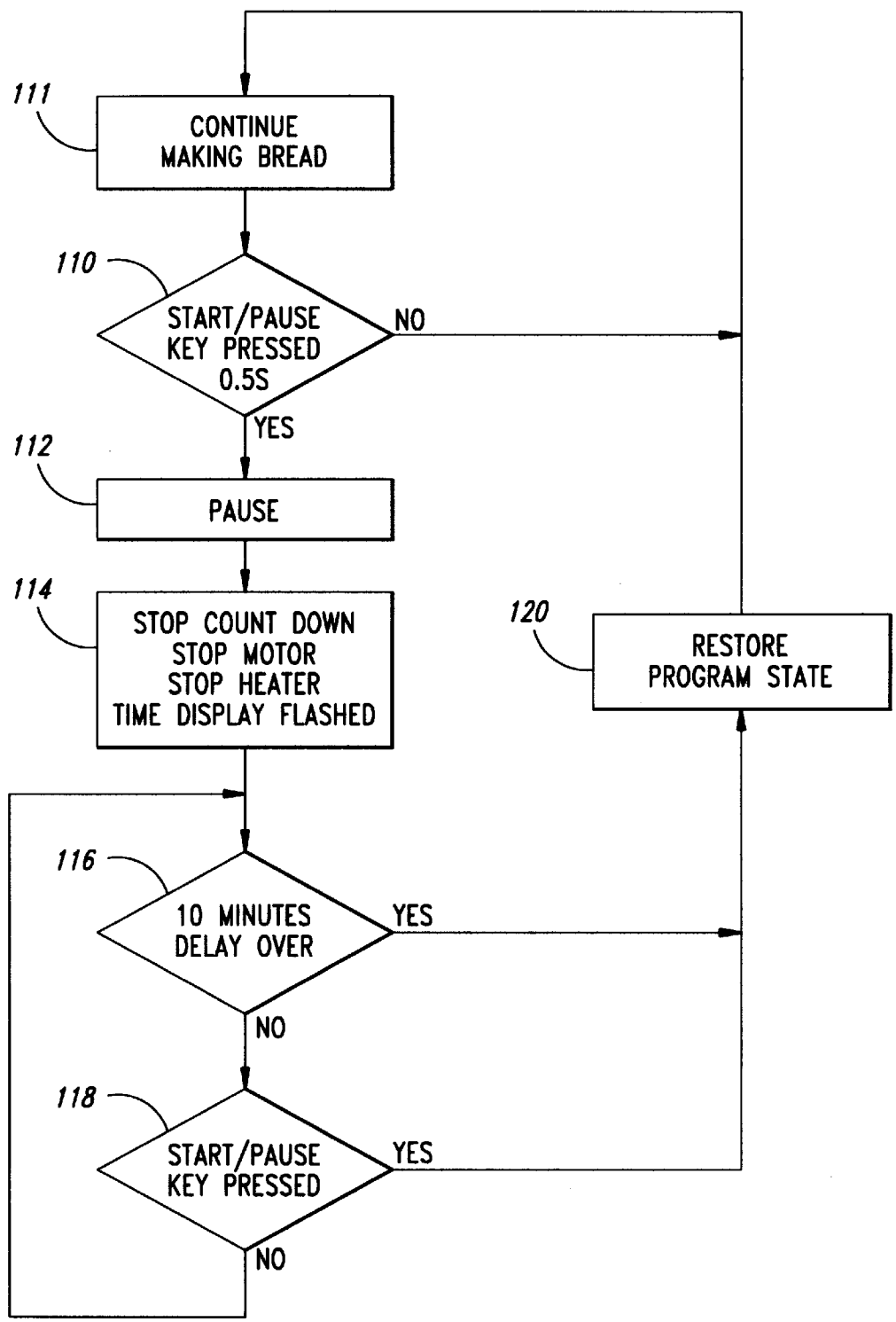
FIG. 7 is a table, or schedule, for specifying the maximum injection amount.
Figure 1:
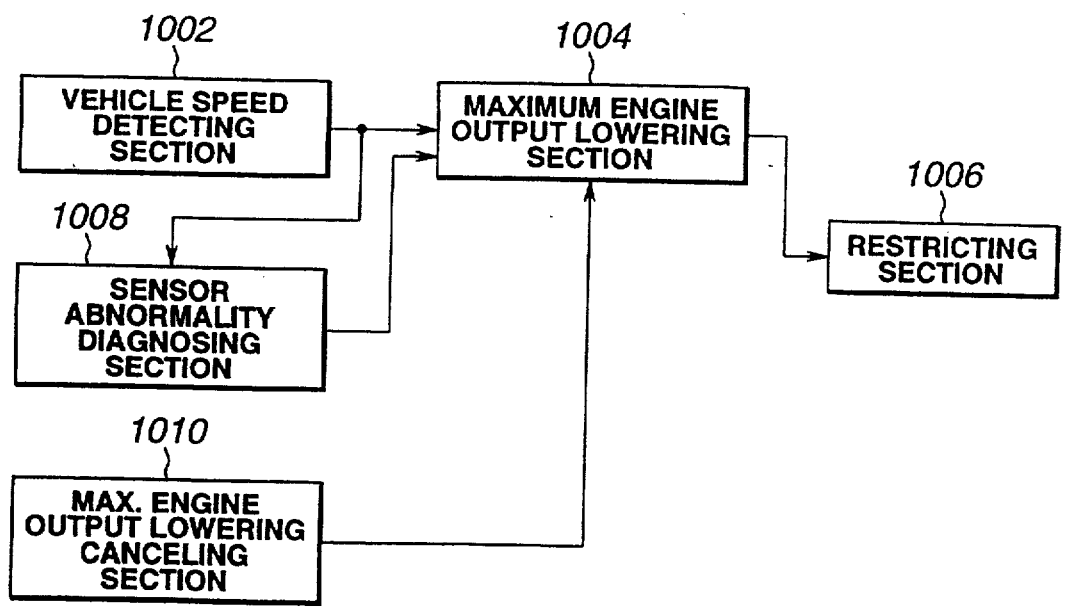
Figure 2:
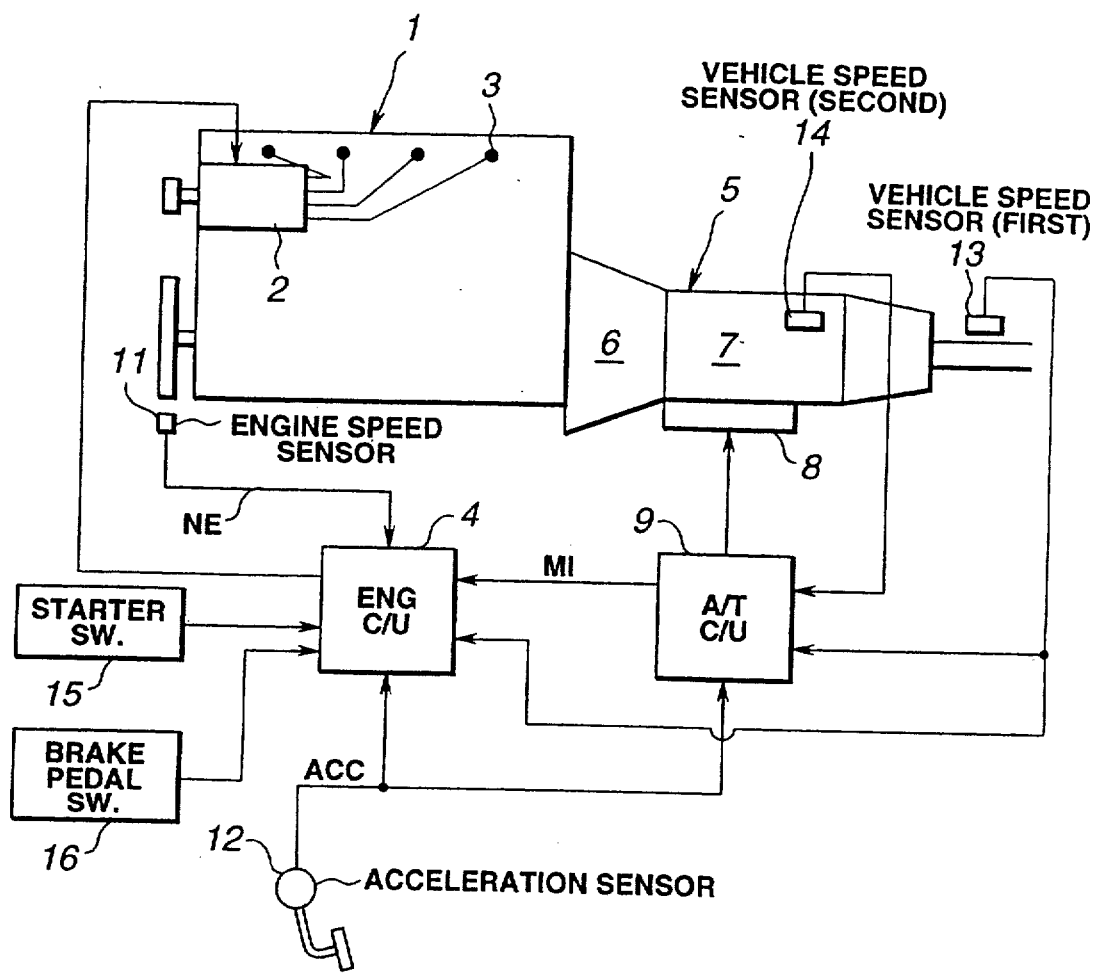
Figure 3:
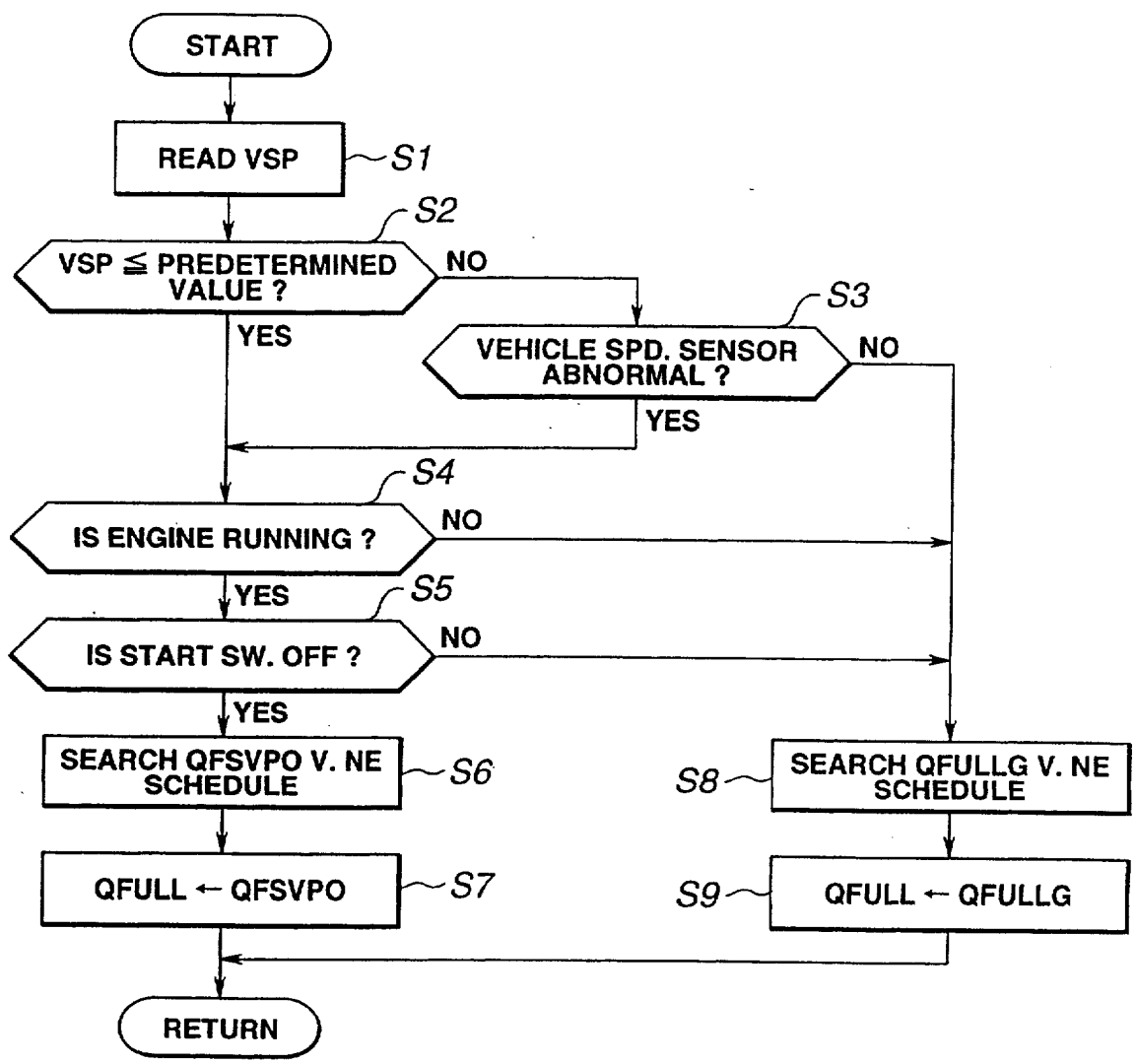
Figure 4:
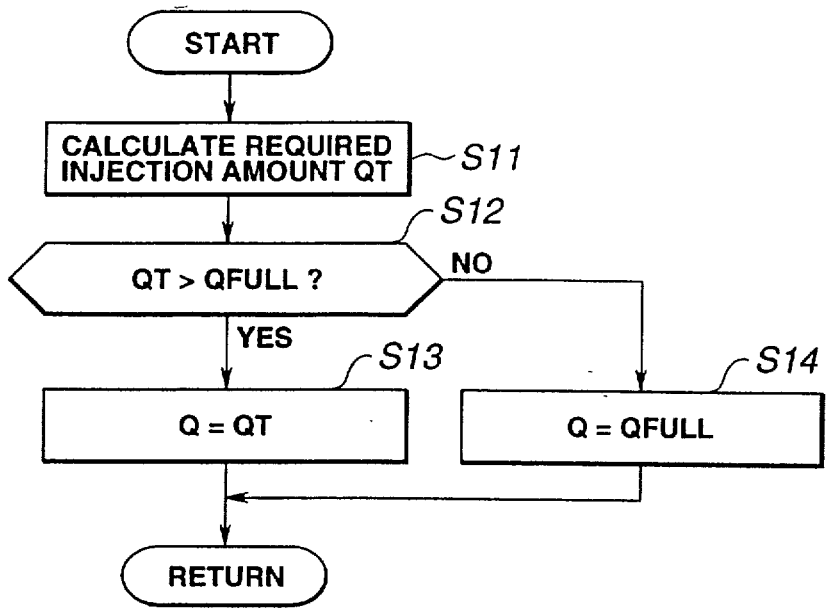
Figure 5:
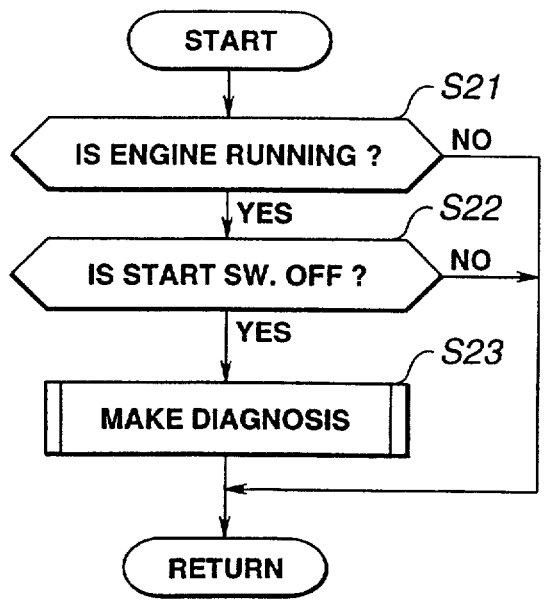
Figure 6:
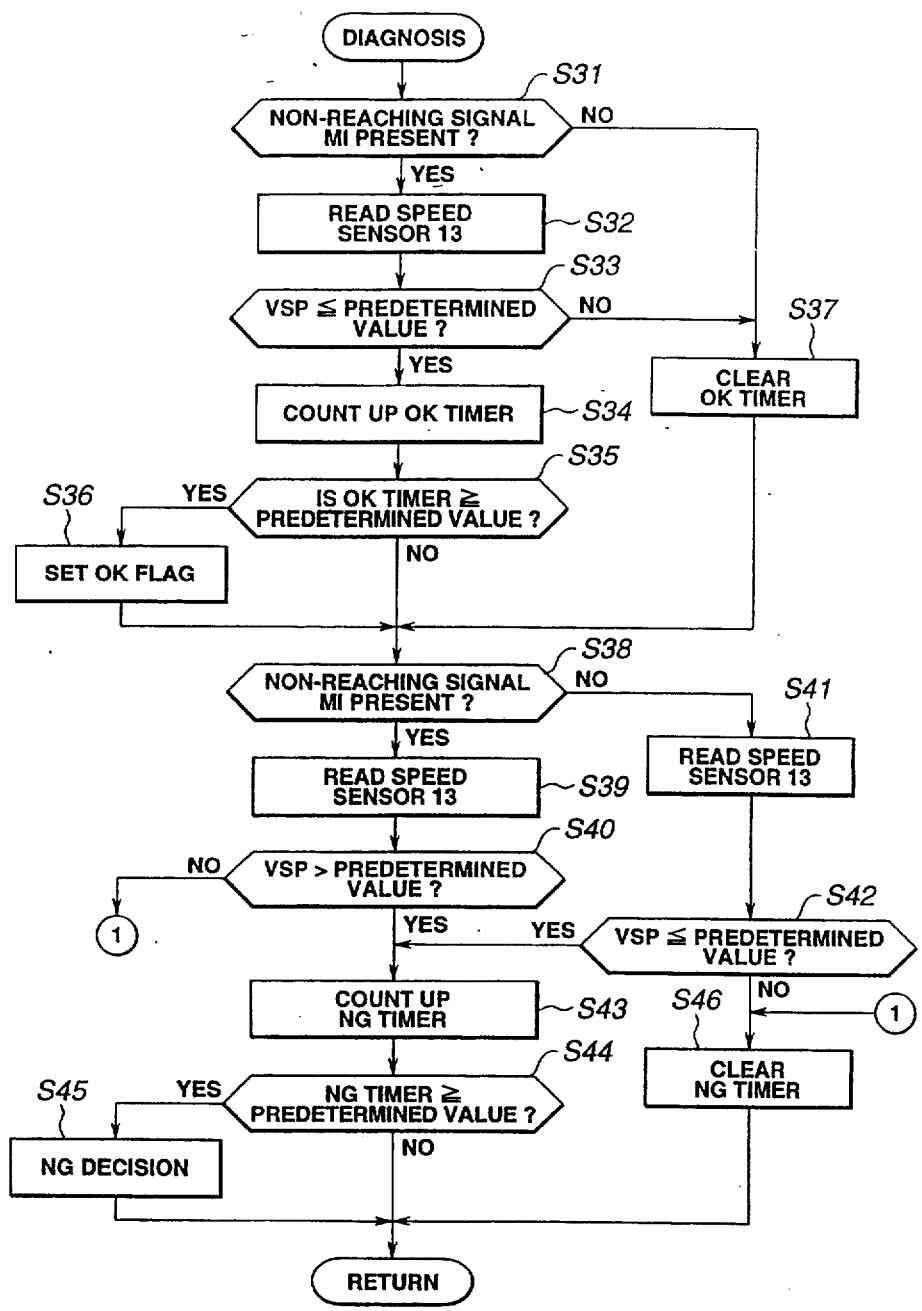
Figure 7:
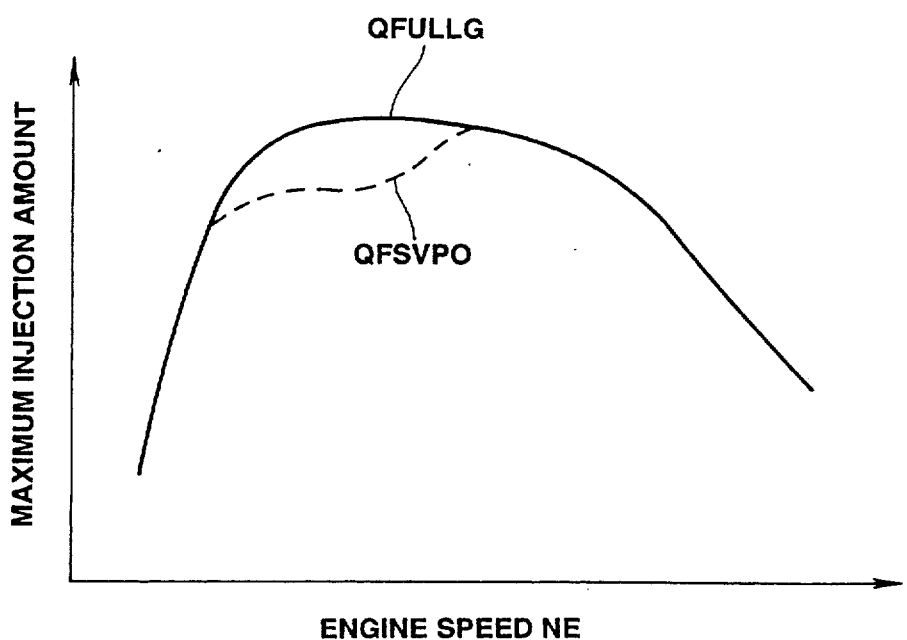

At the step S6, a maximum injection amount QFSVPO schedule is referenced and searched in accordance with the engine speed NE using the table for the maximum injection amount QFSVPO versus NE of FIG. 7. This table for the maximum injection amount QFSVPO is for the maximum torque down operation, in which the maximum injection amount is reduced at the decreasing engine speed side of the curve over a predetermined engine speed range as compared with a conventionally or otherwise used table for a maximum injection amount QFULLG.

At the next step S7, the maximum injection amount is set by setting QFSVPO as QFULL in accordance with the searching result, and then this routine is terminated.

If VSP>the predetermined value and the vehicle speed sensor is normal (as determined at steps S2 and S3), advance is made to steps S8 and S9. Advance is also made to steps S8 and S9 when the engine is not running as determined in step S4, or when the starter switch is not turned OFF as determined in step S5.

At the step S8, the maximum injection amount tables or schedules are consulted and the QFULLG schedule is set, or referenced, and searching of the maximum amount is made in accordance with the engine speed NE, using the table for maximum injection amount QFULLG of FIG. 7. This maximum injection amount QFULLG schedule can be the same schedule which has been conventionally used for the purpose of preventing generation of black smoke. In this schedule, the maximum torque output of a diesel engine is set to prevent exhaustion of soot even when the drivers commands require more power/torque.

At the next step S9, setting or selecting of the maximum injection amount QFULLG is made in accordance with the search result, and then this routine is terminated.

Although not specifically illustrated, another step may be inserted between steps S5 and S6, in which a check is made as to whether the brake pedal is being depressed, based on the output of brake pedal switch 16. If the brake is depressed, the routine moves to S6. If not, step S8 is performed.

Figure 4:
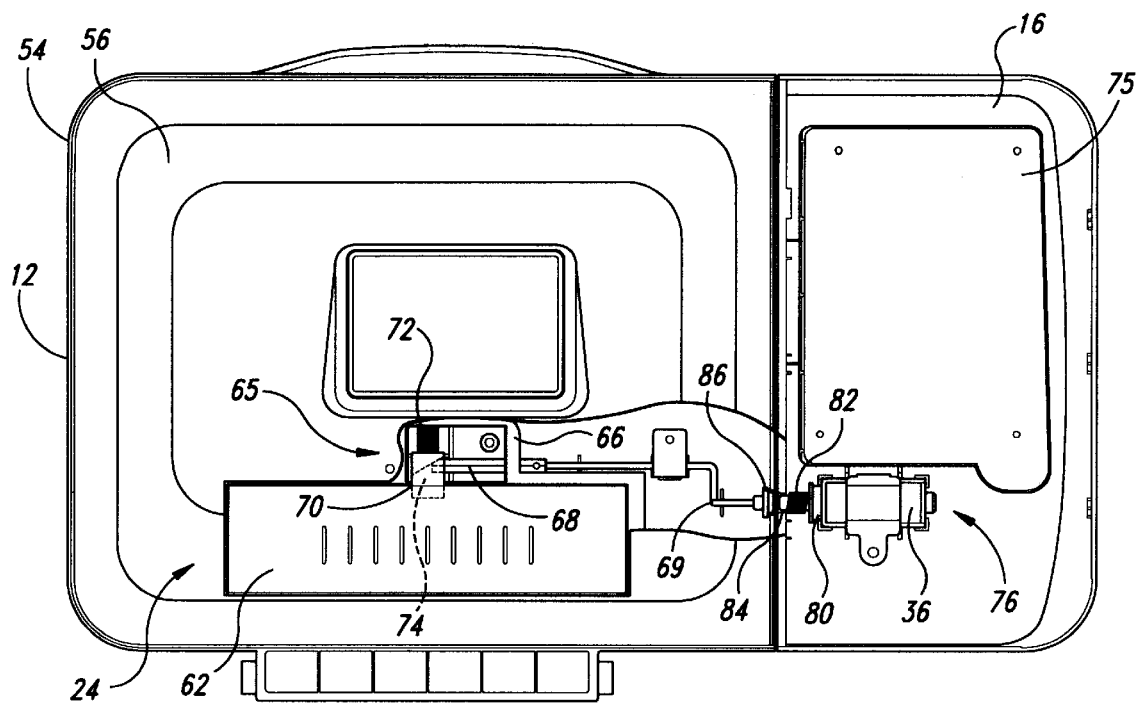
FIG. 4 is a flowchart of an injection amount restricting and applying routine.

FIG. 4 is a flowchart for an injection amount restricting and applying routine.

At a step S11, a required injection amount QT is calculated in accordance with vehicle operating conditions including the engine speed NE, the accelerator opening degree ACC, and the like.

At a step S12, a comparison is made between the calculated required injection amount QT and the maximum injection amount QFULL, which has been determined in the routine of FIG. 3. Then, a judgment is made as to whether or not QT>QFULL.

If QT≦QFULL, advance is made to step S13 at which a setting is made of the final injection amount Q=QT and subsequently fuel injection is performed (not shown). Then, this routine is terminated.

If QT>QFULL (meaning that the required, or calculated, injection amount exceeds the maximum injection amount) advance is made to a step S14 at which a setting is made of the final injection amount Q=QFULL and subsequently fuel injection is performed. Then, this routine is terminated.

Thus, when the vehicle speed VSP is not higher than the predetermined value (for example, 8 km/hr), i.e., when the vehicle is stationary, the maximum injection amount is restricted to the QFSVPO curve so as to reduce maximum engine torque, thereby preventing thermal deterioration of the torque converter.

Because of this, maximum available torque is restricted during vehicle stopping. However, the vehicle speed can be immediately increased at a normal acceleration and the normal maximum injection schedule QFULLG will again be used, thereby raising no problems in connection with drivability.

Additionally, if the vehicle speed sensor 13 is found to be abnormal, the maximum engine torque is decreased, similar to the case in which the vehicle speed VSP is not higher than the predetermined value, thereby improving safety.

Maximum torque down control is canceled during engine stopping. This allows changeover to the QFULLG schedule at the time of engine stopping so that, upon subsequent cranking operation, the engine is immediately controlled based on the QFULLG characteristics, to ensure maximum fuel delivery. Furthermore, during engine starting, maximum torque down control will not take place, which ensures good engine starting performance, particularly during a cold start-up operation.

In this particular embodiment, step S1 in FIG. 3 (employing the vehicle speed sensor 13) performs a vehicle speed detecting function. Steps S2, S6 and S7 accomplish a maximum engine torque lowering function (maximum injection amount decreasing function). Steps S4 and S5 perform a canceling function. Additionally, the routine in FIG. 4 performs an injection amount restricting function.

Next, the diagnosis routine for the vehicle speed sensor 13, performed by the engine control unit 4, will be described with reference to the flowcharts of FIGS. 5 and 6.

Figure 5:
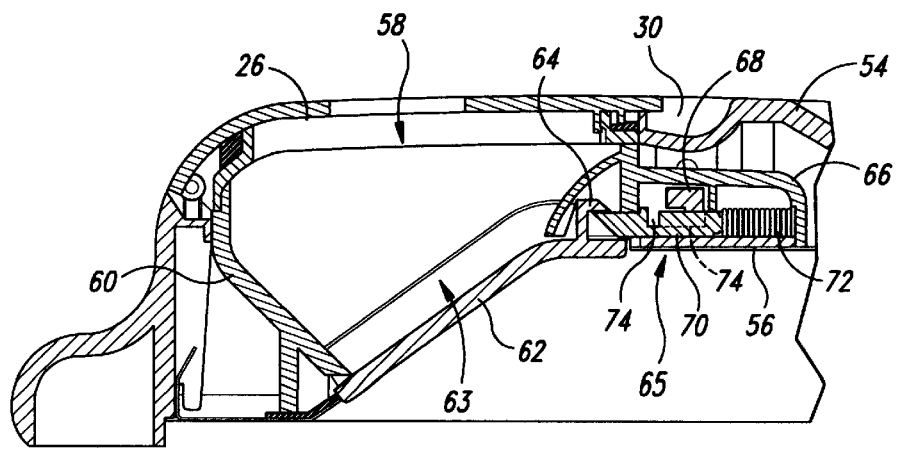
FIG. 5 is a flowchart of a diagnosis condition detection routine.

FIG. 5 is a flowchart for a diagnosis condition detecting routine.

At a step S21, a judgment is made as to whether or not the engine is running. If the engine is running, advance is made to a step S22.

At the step S22, a judgment is made as to whether or not the starter switch (switch 15 in FIG. 2) is turned OFF. If the starter switch is turned OFF, advance is made to a step S23. In step S23, a diagnosis is made in accordance with the routine of FIG. 6, discussed below.

If the engine is not running as determined at the step S21, or if the start switch is not turned OFF as determined at the step S22, this routine is terminated and no diagnosis is made.

Figure 6:
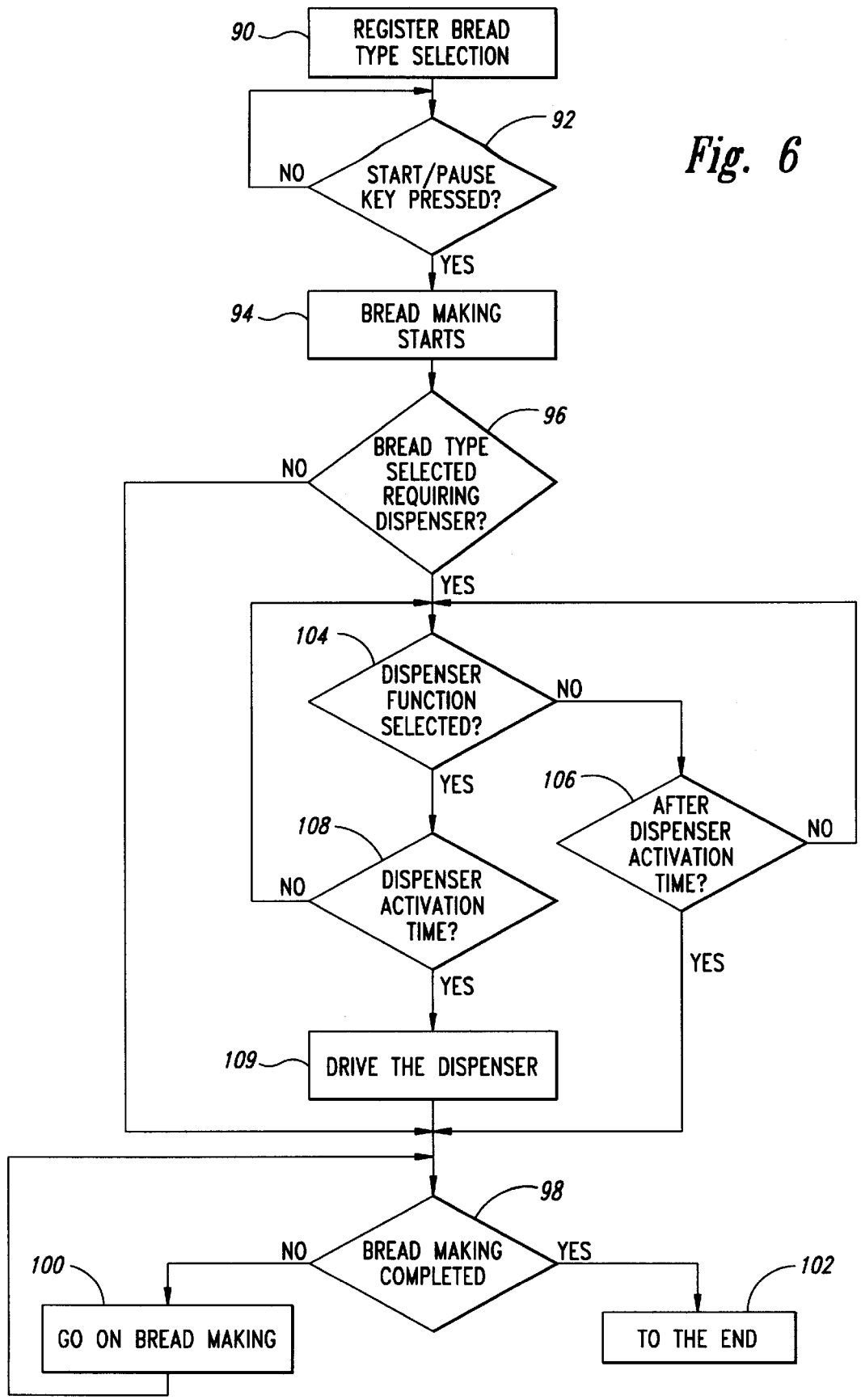
FIG. 6 is a flowchart of a diagnosis routine.

FIG. 6 is a flowchart for a diagnosis routine. This routine performs an abnormality diagnosing function.

At a step S31, a judgment is made as to whether or not the predetermined vehicle speed non-reaching signal MI from the automatic transmission control unit 9 is present or absent on the communication line. The MI signal is generated if the vehicle speed detected by sensor 14 falls below another predetermined value, for example, 8 km/hr or 4 km/hr (depending on the accuracy of sensor 14).

If the signal MI is present, advance is made to a step S32 at which the vehicle speed VSP is read in accordance with the signal from the vehicle speed sensor 13. At the next step S33, a judgment is made as to whether or not the vehicle speed VSP is not higher than the predetermined value (for example, 8 km/hr).

As a result of steps S31 to S33 establishing that the predetermined vehicle speed non-reaching signal MI is present (based on sensor 14) and VSP≦the predetermined value (based on sensor 13), sensor 13 is deemed to be operating normally. Accordingly, advance is made to a step S34 at which an OK timer which has been set to "0" begins a count up operation.

Then, at a step S35, as a result of repetitive operations of S31 through S34 (as the entire routine of FIG. 6 is repetitively performed on the order of every 10 to 20 milliseconds), a judgment is made as to whether or not the OK timer has reached a predetermined value (for example, a value corresponding to 2 seconds). If the OK timer≧the predetermined value, advance is made to a step S36, and a decision of OK is finally made and a corresponding flag is set.

If the predetermined vehicle speed non-reaching signal MI is absent at the step S31, or if VSP>the predetermined value, normal vehicle speed detection cannot be confirmed. Therefore, advance is made to a step S37 at which the OK timer is cleared.

Next, advance is made to a step S38.

At step S38, a judgment is made as to whether or not the predetermined vehicle speed non-reaching signal MI is present or absent on the communication line.

If the predetermined speed non-reaching signal MI is present, advance is made to step S39 at which the vehicle speed VSP is read in accordance with the signal from the vehicle speed sensor 13. At the next step S40, a judgment is made as to whether or not the vehicle speed VSP exceeds the predetermined value (8 km/hr).

As a result, when VSP>the predetermined value is established at S40, the speed sensor 13 will be held to be malfunctioning. Subsequently, the routine moves further to a step S43 at which a NG (NG=No Good) timer is counted up.

If the predetermined vehicle speed non-reaching signal MI is absent in step S38, advance is made to step S41 at which the vehicle speed VSP is read in accordance with the signal from the vehicle speed sensor 13. At the next step S42, a judgment is made as to whether or not the vehicle speed VSP is not higher than the predetermined value.

As a result, when VSP≦the predetermined value is determined at S42, the conclusion is that the vehicle speed sensing is malfunctioning. Accordingly, advance is made to step S43 at which the NG timer is counted up.

Then, at a step S44, a judgment is made as to whether or not the NG timer is not less than a predetermined value (for example, a value corresponding to 5 seconds). (Experiments indicate that setting the NG time setpoint at 5 seconds and the OK time setpoint at 2 seconds produces good results.) If the NG timer≧the predetermined value, advance is made to a step S45, and a decision of NG is finally made.

If the test at step S40 is negative, meaning that VSP≦the predetermined value (the predetermined vehicle speed non-reaching signal MI is present and VSP≦the predetermined value) or if a negative answer occurs at step S42, meaning that VSP>the predetermined value (the predetermined vehicle speed non-reaching signal MI is absent and the vehicle speed VSP>the predetermined value), it is decided that the vehicle sensor is functioning well. Therefore, advance is made to a step S46 at which the NG timer is cleared.

With such a diagnosis routine, the presence or absence of an abnormality in the vehicle speed sensor 13 can be diagnosed with high reliability.

The entire contents of Japanese Patent Application Tokuganhei (1997) 09-037889, filed on Feb. 21, 1997, is incorporated herein by reference.

Although the invention has been described above in connection with certain specific embodiments of the invention, the invention is not limited to the specific embodiments described above. Modifications and variations of the embodiments described above will occur to those skilled in the field. For example, the invention is applicable to a gasoline engine wherein maximum torque reduction is made by restricting the maximum fuel supply, spark advance, air-fuel ratio control, and the like.

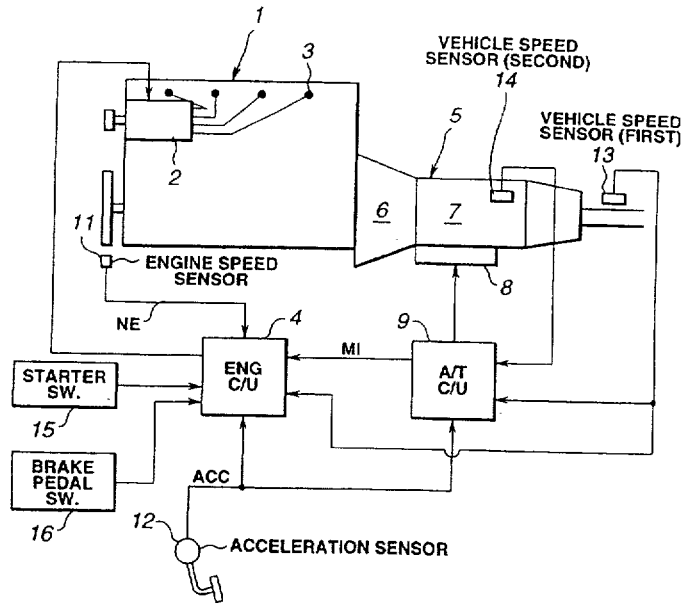

What is claimed is:

1. A vehicle, comprising:

(a) an internal combustion engine;

(b) a torque converter coupled to the internal combustion engine;

(c) a first sensor to sense vehicle speed and generate a vehicle speed signal;

(d) a second sensor to sense a vehicle operator command and generate a vehicle operator command signal; and (e) a control unit, the control unit including a memory which stores first and second maximum engine output schedules, the first maximum engine output schedule having a range of lower maximum engine output magnitude than the second maximum engine output schedule, the control unit (1) calculating a required engine output magnitude based on the vehicle operator command signal generated by the second sensor, (2) selecting the first maximum engine output schedule when vehicle speed sensed by the first sensor is below a predetermined value and selecting the second maximum engine output schedule when the vehicle speed sensed by the first sensor is above the predetermined value, and (3) applying a selected maximum engine output schedule when required engine output magnitude exceeds a selected maximum engine output magnitude.

2. A vehicle as set forth in claim 1, further comprising:

an additional sensor to sense vehicle speed and generate an additional vehicle speed signal; and diagnosis logic to generate a malfunction signal when vehicle speed signals from the first and additional sensors do not match; and wherein the control unit applies the first maximum engine output schedule when the malfunction signal is generated.

3. A system for controlling output of an internal combustion engine that is drivably connected with a torque-converter-incorporating transmission for a vehicle, comprising:

(a) a first sensor to sense vehicle speed and generate a vehicle speed signal;

(b) a second sensor to generate a vehicle operator command signal; and (c) an electronic microprocessor including (1) means for calculating a required engine output magnitude based on the vehicle operator command signal generated by the second sensor;

(2) means for providing first and second maximum engine output schedules, wherein the first maximum engine output schedule has a range of lower maximum engine output magnitude than the second maximum engine output schedule;

(3) means for selecting the first maximum engine output schedule when vehicle speed sensed by the first sensor is below a predetermined value and for selecting the second maximum engine output schedule when the vehicle speed sensed by the first sensor is above the predetermined value; and (4) means for applying a selected maximum engine output schedule when required engine output magnitude exceeds a selected maximum engine output magnitude.

4. A system of claim 3, further comprising:

(a) an additional sensor to sense vehicle speed and generate an additional vehicle speed signal;

(b) diagnosis logic to generate, responsive to determination that signals from both the first and additional sensors do not match, a malfunction signal; and (c) means for applying the first maximum engine output schedule when the malfunction signal is generated.

5. In an automotive power train including an engine, an automatic transmission with a torque converter that is drivably coupled to the engine, a method for controlling the engine output, comprising the steps of:

(a) sensing vehicle operative conditions including vehicle speed;

(b) determining a required engine output magnitude based on the vehicle operative conditions sensed in step (a);

(c) providing first and second maximum engine output schedules wherein said first maximum engine output schedule includes a range of lower maximum engine output magnitude than the second maximum engine output schedule;

(d) selecting the first maximum engine output schedule when vehicle speed is below a predetermined value and selecting the second maximum engine output schedule when vehicle speed is above the predetermined value; and (e) applying said lower maximum engine output magnitude when required engine output magnitude is greater than the selected first maximum engine output schedule and subsequently controlling the engine in accordance with said applied lower maximum engine output magnitude.

6. A method for controlling an output of an internal combustion engine drivably connected to an automatic transmission having a torque converter, comprising the steps of:

(a) sensing vehicle operative conditions including vehicle speed;

(b) referencing a first maximum output torque schedule when the vehicle speed sensed in step (a) is below a predetermined value;

(c) referencing a second maximum output torque schedule when the vehicle speed sensed in step (a) is greater than the predetermined value, wherein the first maximum output torque schedule has a range of reduced maximum output torque compared with the second maximum output torque schedule; and (d) controlling maximum engine output in accordance with the maximum output torque schedule referenced in either step (b) or step (c).

7. A method of claim 6, wherein said engine is a diesel engine and said first and second maximum output torque schedules specify fuel injection amount as a function of a vehicle operating condition.

8. A method of claim 7, wherein said vehicle operative conditions include engine speed and accelerator pedal position.

9. A method of claim 8, further comprising the steps of:

diagnosing whether a vehicle speed sensor malfunctions; and referencing the first maximum output torque schedule when the vehicle speed sensor is diagnosed as malfunctioning.

10. A method of claim 9, further comprising the steps of:

detecting when the engine is stopped; and disabling controlling maximum engine output with the reduced maximum output torque when engine stop has been detected.

11. A method of claim 9, further comprising the steps of:

detecting when an engine starting operation takes place; and disabling controlling maximum engine output with the reduced maximum output torque when engine starting operation is detected.

12. A method of claim 6, wherein said engine is a diesel engine.

* * * * *

UNITED STATES PATENT AND TRADEMARK OFFICE
CERTIFICATE OF CORRECTION

PATENT NO. : 5,948,037　　　　　　　　　　　Page 1 of 8
DATED     : September 7, 1999
INVENTOR(S) : Hirotada Muraki It is certified that error appears in the above-identified patent and that said Letters Patent is hereby corrected as shown below:

The Title page should be deleted and substitute therefor the attached title page.

Drawings:

Replace six sheets of drawings, Figures 1-7 with the attached six sheets of drawings, Figures 1-7 as shown on the attached pages.

Signed and Sealed this

Fifteenth Day of August, 2000

Q. TODD DICKINSON

*Attest:*

*Attesting Officer*　　　　　　　*Director of Patents and Trademarks*

United States Patent [19]
Muraki

[11] Patent Number: 5,948,037
[45] Date of Patent: Sep. 7, 1999

[54] ENGINE CONTROL SYSTEM WHICH REDUCES THERMAL DETERIORATION OF A TORQUE CONVERTER

[75] Inventor: Hirotada Muraki, Yokohama, Japan

[73] Assignee: Nissan Motor Co., Ltd., Yokohama, Japan

[21] Appl. No.: 09/027,219

[22] Filed: Feb. 20, 1998

[30] Foreign Application Priority Data

Feb. 21, 1997 [JP] Japan ................................. 9-037889

[51] Int. Cl.⁶ .................... B60K 28/00; G05D 17/02; F02D 41/22
[52] U.S. Cl. ........................ 701/114; 701/54; 701/63
[58] Field of Search ...................... 701/114, 110, 701/102, 101, 54, 51, 62, 63

[56] References Cited

U.S. PATENT DOCUMENTS

| | | | |
|---|---|---|---|
| 4,685,051 | 8/1987 | Hattori et al. | 701/63 |
| 4,805,751 | 2/1989 | Ohkumo et al. | 477/176 |
| 4,843,915 | 7/1989 | Sugimura et al. | 477/80 |
| 4,896,569 | 1/1990 | Ito et al. | 701/62 |
| 5,103,692 | 4/1992 | Shimanaka et al. | 74/857 |
| 5,111,717 | 5/1992 | Takeuchi et al. | 477/148 |
| 5,157,990 | 10/1992 | Ohashi | 701/63 |
| 5,201,250 | 4/1993 | Kato et al. | 74/858 |
| 5,216,938 | 6/1993 | Yamaguchi | 701/63 |
| 5,224,045 | 6/1993 | Stasell | 364/431.07 |
| 5,228,368 | 7/1993 | Kato et al. | 74/866 |

FOREIGN PATENT DOCUMENTS

| | | |
|---|---|---|
| 60-4433 | 1/1985 | Japan . |
| 97/10965 | 3/1997 | WIPO . |

*Primary Examiner*—Willis R. Wolfe
*Assistant Examiner*—Hieu T. Vo
*Attorney, Agent, or Firm*—Foley & Lardner

[57] ABSTRACT

An engine control system reduces thermal deterioration of a torque converter. Maximum torque down control is provided, using simple processing and a minimum number of required signals, to reduce thermal deterioration. A maximum fuel injection amount QFULL is reduced when vehicle speed is less than a predetermined value that is close to zero, thereby lowering maximum engine torque. Also, the presence or absence of an abnormal vehicle speed sensor is diagnosed and maximum engine torque is also lowered during occurrence of an abnormality.

12 Claims, 6 Drawing Sheets